United States Patent [19]

McElroy

[11] Patent Number: 4,950,371

[45] Date of Patent: Aug. 21, 1990

[54] ELECTROCHEMICAL HYDROGEN SEPARATOR SYSTEM FOR ZERO GRAVITY WATER ELECTROLYSIS

[75] Inventor: James F. McElroy, Suffield, Conn.

[73] Assignee: United Technologies Corporation, Hartford, Conn.

[21] Appl. No.: 328,279

[22] Filed: Mar. 24, 1989

[51] Int. Cl.$^5$ .............................................. C25B 1/04
[52] U.S. Cl. ................... 204/129; 204/263; 204/264; 204/266; 204/253; 204/267; 204/269; 204/270; 204/296; 55/16; 55/158; 55/159
[58] Field of Search ................. 204/129, 15, 152, 263, 204/264, 266, 269, 296, 253, 267, 270; 55/16, 32, 158, 159, DIG. 25

[56] References Cited

U.S. PATENT DOCUMENTS 4,451,347 5/1984 Wüllenweber ...................... 204/129
4,602,987 7/1986 Bonaventura et al. ............. 204/129

FOREIGN PATENT DOCUMENTS 2134812 8/1984 United Kingdom .................. 55/158

Primary Examiner—John F. Niebling
Assistant Examiner—Kathryn Gorgos

[57] ABSTRACT

A zero gravity phase separation water electrolysis system (FIG. 1) for producing hydrogen and oxygen in gaseous form from water, in which the hydrogen output (12), which includes proton water, is fed first to a hydrophilic separator (10), or some other form of a phase preferential, porous separator (such as a hydrophobic separator or a combination of the two; FIG. 5), and then to an electrochemical separator (100), for separating the hydrogen gas from the proton water, with no significant parasitic loss and without the need for venting. The two separators can be stacked and integrated together with the hydrophilic material layer (10A; FIG. 4) of the hydrophilic separator forming the top of the electrochemical separator. The electrochemical separator includes a solid polymer membrane (101) of a sulfonated fluorocarbon sandwiched between two platinum electrodes (102/103). The hydrogen separated in the electrochemical chamber, along with protonically pumped water, is fed back (105) into the hydrophilic separator, while the water from which the hydrogen has been electrochemically stripped is fed back (17) under relatively low pressure to the water feed input line (1) for the electrolysis module (FIG. 1), or, if so desired, directly to the oxygen feed-back line (216) at relatively high pressure (FIG. 5).

17 Claims, 3 Drawing Sheets

ELECTROCHEMICAL HYDROGEN SEPARATOR SYSTEM FOR ZERO GRAVITY WATER ELECTROLYSIS

TECHNICAL FIELD

This invention relates to water electrolysis and more particularly to the separation of the process water from the product gases in water electrolysis. Even more particularly, the present invention relates to such separation in a zero gravity environment, such as may exist in space, in which the hydrogen gaseous products need to be separated from proton process water, that is water saturated with hydrogen.

BACKGROUND ART

In performing water electrolysis in space, it is desirable to separate the process water from the product gases (i.e., $H_2$ and $O_2$). Further, it is important not to waste or discharge any of the process water or product gases.

A typical acid membrane electrolyzer has water circulated throuqh the anode ($O_2$ generation) chamber, as shown in the "electrolysis module" of FIG. 1. A small part of this water transports through the membrane as the electrolysis process is carried out. This water, sometimes referred to as proton water, appears in the hydrogen chamber and is discharged with the hydrogen gas.

In terrestrial applications, the product gases are separated, at pressure, from the process water in gravity separators. The water separated from the hydrogen gas is de-pressurized and a further gravity separation conducted when dissolved hydrogen comes out of solution. In most terrestrial applications, this hydrogen from the ambient pressure separation is simply discarded. This hydrogen side water is then re-injected into the circulating oxygen side water loop.

In zero gravity space applications, water and gas can be separated using various phase preferential, porous materials, including either hydrophilic and/or hydrophobic materials. However, hydrogen gas separated from a second low pressure device would have to be vented. If not vented, pump difficulties could arise.

In any event, the low pressure separated hydrogen would be a parasitic loss. A further difficulty occurs when the space platform prohibits venting.

DISCLOSURE OF INVENTION

Thus, a primary object of the present invention is to provide in association with water electrolysis a separation system which separates the process water from the product gases in a manner which minimizes any parasitic losses and avoids any venting or storage problems, whether in a space environment or otherwise.

The subject invention achieves this objective by removing virtually all of the dissolved hydrogen from the proton water before it is de-pressurized or directly injected into the circulating oxygen side water loop of the electrolysis unit by using an electrochemical separator for the proton water, that is the water saturated with hydrogen ($H_2$), in combination with a phase preferential, porous separator in the form of a hydrophilic and/or hydrophobic separator(s). Thus, it minimizes parasitic losses and eliminates any need for venting or any low pressure hydrogen ($H_2$) storage.

Thus, on the hydrogen side of the electrolytic module, the hydrophilic and/or hydrophobic separator(s), which can be, for example, of the static vortex type, is supplemented with an electrochemical pump to separate both the hydrogen gas and dissolved hydrogen from the protonically pumped water. The water substantially stripped of hydrogen ($H_2$) is then delivered to a water feed accumulator or directly injected into the circulating oxygen side water loop for further electrolysis processing.

Another advantage of the electrochemical hydrogen separator is that it also can be used as an instrument to measure the effectiveness of the $H_2/H_2O$ hydrophilic and/or hydrophobic separator(s).

The foregoing and other features and advantages of the present invention will become more apparent from the following further description and its related drawing.

MODES FOR CARRYING OUT THE INVENTION

Figure 1:
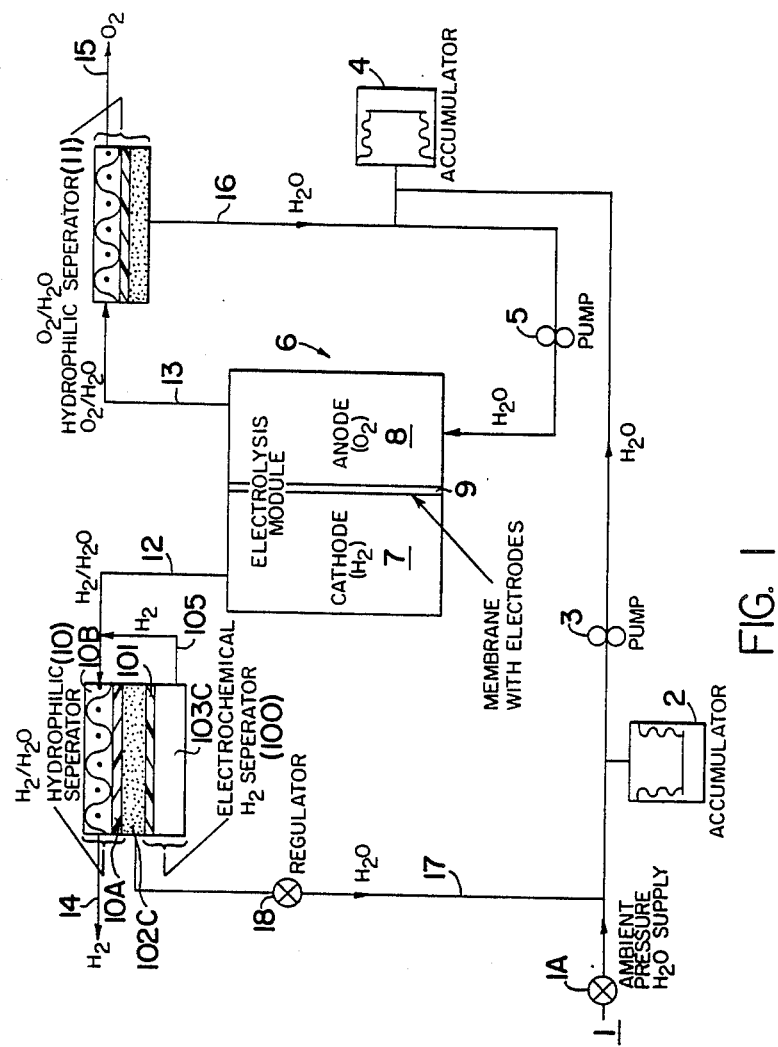
FIG. 1 is a simplified, flow chart diagram of a first exemplary electrolysis system with a zero gravity phase separation system, utilizing the electrochemical separator in association with a hydrophilic separator for the hydrogen gas stream, all as taught in the present invention, in which first embodiment the hydrogen-stripped water is delivered to the water feed accumulator.
Figure 2:
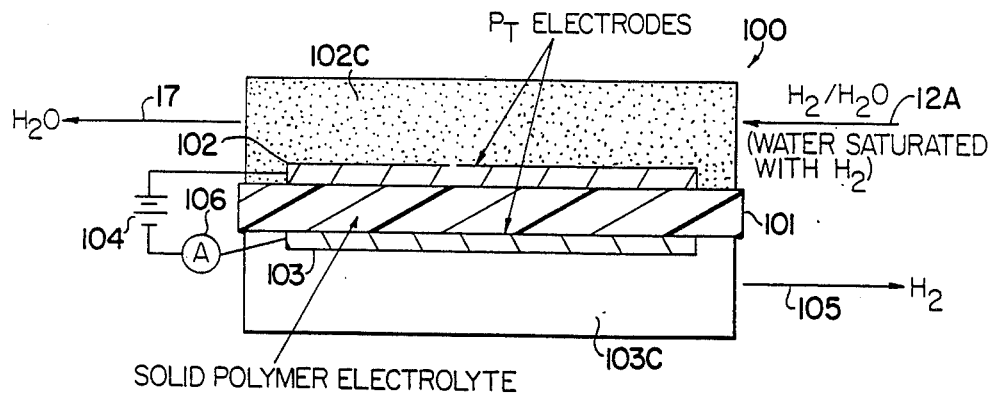
FIG. 2 is a simplified, schematic, close-up view of the electrochemical hydrogen separator used in the system of FIG. 1.
Figure 3:
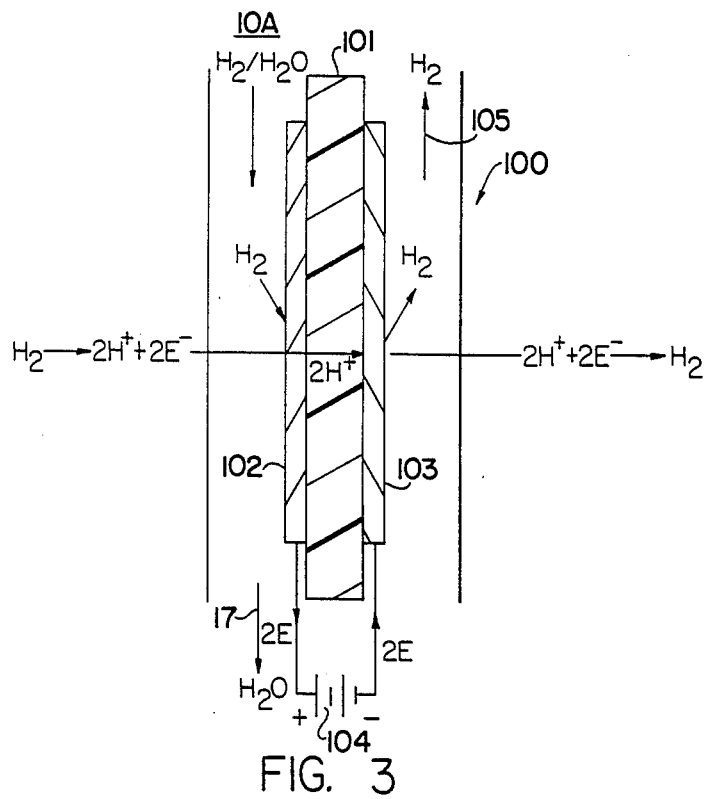
FIG. 3 is a simplified, schematic view illustrating the electrochemical hydrogen separator reactions which occur in the separator of FIG. 2.
Figure 4:
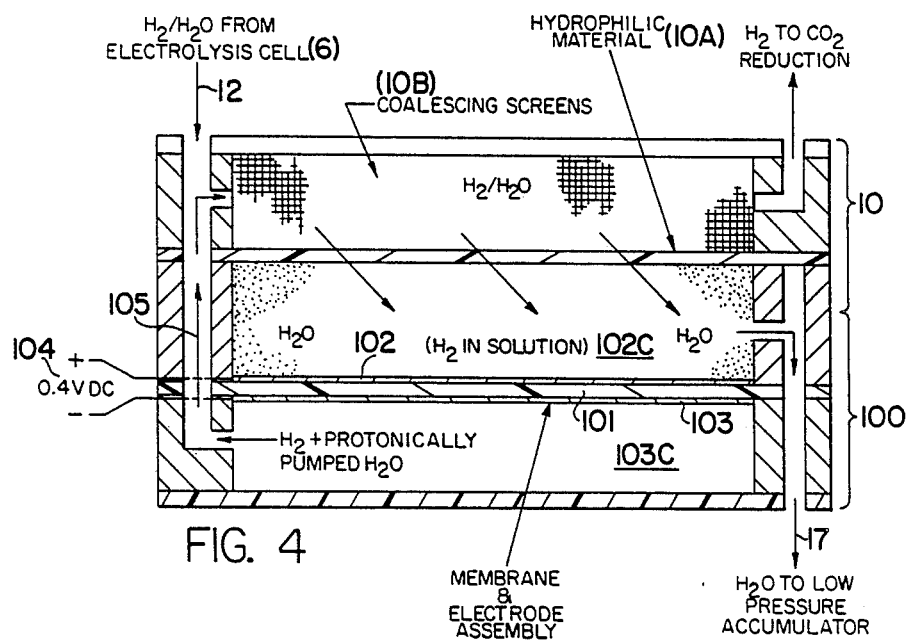
FIG. 4 is a more structurally detailed, cross-sectional view of the exemplary electrochemical hydrogen separator of FIG. 2.

It is noted that FIG. 1 shows a first exemplary, supplemental electrochemical hydrogen separator 100, as it is located in the overall water electrolysis system; while the details in simplified form of the exemplary electrochemical hydrogen separator are shown in FIGS. 2 & 4, and the electrochemical actions which take place in the electrochemical separator 100 are illustrated in FIG. 3.

As can be seen in FIG. 1, the overall water electrolysis system includes a water supply source 1 supplying water under ambient pressure to an accumulator 2 and thereafter to a pump 3, which supplies source water under pressure to the accumulator 4. The water feed supply line 1 includes a control valve 1A, which is opened when the water in accumulator 2 gets low. Likewise, when the water in accumulator 4 is low, the pump 3 is turned "on" until it is again filled.

The pressurized supply water is further pumped by pump 5 to an electrolysis module 6. All this insures that an appropriate supply of water will always be available to the electrolysis module 6 when needed.

As is standard, the electrolysis module 6 includes a cathode ($H_2$) chamber 7 and an anode ($O_2$) chamber 8 separated by a membrane 9 with electrodes, which membrane is typically permeable but not porous. The product gases of hydrogen ($H_2$) and oxygen ($O_2$) produced in the electrolysis module 6 go to the phase preferential, porous separators 10 & 11, respectively, which can be of the static vortex, hydrophilic or hydrophobic type, the former being shown in FIGS. 1 & 4. Such separators produce a relatively negligible pressure drop across them to the non-passed phase fluid.

Vortex separators utilize a phase preferential, porous material that in a hydrophilic form readily absorbs water but prevents the passage of gas typically up to several pounds per square inch (psi) due to the bubble pressure characteristics of the hydrophilic material. The relative actions are the opposite in a hydrophobic type material, that is, the hydrophobic material readily absorbs and transfers gas, but prevents the passage of water.

In either case, typically this mixed water/gas flow is caused to change flow direction by coalescing screens (note upper portion 10B of FIG. 4) such that momentum results in all of the liquid contacting the phase preferential, porous material. A small differential pressure across the hydrophilic material then withdraws the liquid water from the mixed water/gas stream, with the opposite withdrawal being true for hydrophobic material.

A typical acid membrane electrolyzer, such as the electrolysis module 6, has water circulated through the anode ($O_2$ generation) chamber 8 from the pump 5. A small part of this water transports through the membrane 9, as the electrolysis process is carried out.

This water saturated with hydrogen ($H_2$), sometimes referred to as proton water, appears in the hydrogen chamber 7 and is discharged with the hydrogen gas out of the module 6 through the outlet line 12. The "$H_2/H_2O$" then goes to the hydrophilic separator 10, and the hydrogen gas (as discussed more fully below in connection with the electrochemical "$H_2$" separator 100) exits out the line 14 for ultimate use.

The product oxygen gas ($O_2$) with water is discharged out of the module 6 through the output line 13 into the hydrophilic separator 11 and ultimately in its gaseous form out line 15 for ultimate use. The remaining water, with the oxygen gas removed in the separator 11, is fed back into the module 6 through a circulating, oxygen-side water loop or feed-back line 16 for further electrolysis processing.

The foregoing generally represents standard "prior art" technology and, without further technology, would have the "prior art" problems discussed above.

However, in accordance with the present invention, an electrochemical separator 100 is included in association with the phase preferential, porous separator 10, whether the hydrophilic or the hydrophobic type, either stacked and integrated together, as generally illustrated in FIG. 1 and more particularly illustrated in FIG. 4, or provided in separate units, preferably stacked, and appropriately linked together with liquid and gas lines. When stacked and integrated together, the hydrophilic material layer 10A serves as the top of the electrochemical inlet or upper chamber 102C, as can be seen in FIG. 4, with the two separators 10/100 sharing a common barrier interface: in the form of the phase preferential, porous, hydrophilic layer 10A.

As can be seen generally in FIG. 1 and in greater detail in FIGS. 2 & 4, the electrochemical "$H_2$" separator 100 includes a solid polymer electrolyte "membrane" 101, which is permeable but not porous. The membrane layer 101 can be made out of, for example, Dupont's "Nafion 120" membrane, which is made of a sulphonated fluorocarbon. As can be seen in FIG. 2, two, opposed platinum (Pt) electrodes 102 & 103 are provided on either sides of the solid polymer electrolyte 101 across which electrodes a DC potential is maintained by a DC power source 104.

As generally noted above, the entry chamber 102C includes a series of coalescing screens 10B, as generally illustrated in FIG. 4, for structural strength and producing some turbulence in the fluid flow. An exemplary material for the hydrophilic barrier layer 10A is "SUPOR-450" of Gelman Scientific, which is made of a polysulfone with forty-five-hundredths (0.45) of a micrometer and a bubble pressure of thirty-six (36) psi.

When the external DC power source 104 is applied to the electrochemical cell 101–103, hydrogen ions ($H^+$) will transport through the permeable membrane 101 following the electrochemical reactions shown in FIG. 3, and exit out line 105 (see FIG. 1) to be joined in the proton water input line 12 back to the hydrophilic separator 10. By setting a voltage of, for example, one-half volt DC (0.5 VDC) on the single cell hydrogen separator 100, of the order of seven and a half (7.5 cc's) cubic centimeters of hydrogen ($H_2$) will be removed from the $H_2O/H_2$ solution (proton water) for each amp of current flow.

The electrochemical hydrogen separation reactions and the electrochemical notations of FIG. 3 are well known and self-explanatory, and, for the sake of brevity, will not be repeated here.

As can be seen in FIG. 1, the water, after the hydrogen has been removed by the hydrophilic separator 10 and the electrochemical "$H_2$" separator 100 working together, is fed back into the electrolysis system for further processing through feed-back line 17 working under the control of a differential pressure regulator 18. The regulator 18 insures that the appropriate pressure differential is present across the phase preferential, porous separator 10 consistent with the bubble pressure characteristic of the porous barrier material 10A contained within it.

The water is then delivered to the relatively low pressure water feed accumulator 2, rather than directly to the oxygen-side return line 16. Alternatively, as described more fully below in connection with FIG. 5, particularly for a high pressure system, the hydrogen ($H_2$) stripped water can be directly injected into the circulating oxygen-side return loop (216).

Thus, in contrast to the oxygen/water loop 13/16, which uses only the vortex separator 11, the hydrogen/water loop 12–17 uses a two-step separation, using first the static vortex hydrophilic separator 10 (and/or a hydrophobic separator) and then the electrochemical hydrogen pump separator 100.

In the oxygen/water loOp 13/16 water saturated with oxygen gas is circulated through the system. As gaseous oxygen is produced, it is separated from the saturated liquid water in the vortex separator 11 for output at line 15.

In the hydrogen/water discharge 12, gaseous hydrogen initially is separated from the hydrogen-saturated proton water in the vortex hydrophilic separator 10. The separated hydrogen saturated water subsequently passes through the electrochemical pump or separator 100, which strips the water of the dissolved hydrogen, raises the hydrogen pressure sufficiently to discharge this hydrogen gas into the discharge 12 from the electrolysis stack or module 6. The processed water, essentially free of dissolved hydrogen, is directed through feed-back line 17 to the low pressure water feed accumulator 2, which ultimately supplies water to the anode chamber 8 after being pressurized by pumps 3 & 5.

As noted above, another advantage of the electrochemical hydrogen separator 100 is that it can be used as an instrument to measure the effectiveness of the $H_2/H_2O$ hydrophilic separator 10. With a set voltage on the electrochemical hydrogen separator 100, an increased current would be observed, should the hydrophilic separator 10 pass any gaseous hydrogen ($H_2$) along with the hydrogen dissolved in the proton water. An ammeter 106 can be provided in the DC circuit for this purpose (note FIG. 2), if so desired.

It should be understood that the illustrations of FIGS. 1 & 2 are simplified, schematic views, and the simply drawn elements thereof are not to be taken as actual physical structures of the form literally illustrated. Although FIG. 4 is more structurally accurate than FIG. 2, it likewise is simplified, as will be understood to those of ordinary skill in the art.

The embodiment of FIG. 1 can be a relatively low, two hundred (200 psia) pounds per square inch absolute pressure system, used, for example, as part of an astronaut's life support system, with the various exemplary pressures involved outlined below:

| Location | Exemplary Pressure (psia) |
| --- | --- |
| feed water 1 | 15–30 |
| between accumulator 4 and pump 5 | 190 |
| upstream side of pump 5 | 210 |
| cathode outlet line 12 | 160 |
| $H_2$ product outlet 14 | 160 (approx.) |
| upstream side of regulator 18 | 155 |
| downstream side of regulator 18 | 15–30 |
| anode outlet line 13 | 200 |
| $O_2$ product outlet 15 | 200 (approx.) |
| return loop line 16 | 190–195 |

It is noted that the water feed line 1 is at a relatively low pressure of, for example, fifteen to thirty (15–30) psia, while the return loop line 16 is at a relatively high pressure of one hundred ninety to one hundred and ninety-five (190–195) psia, a relative ratio factor of approximately nine (9).

As generally noted above, the phase preferential, porous separator could be, as an alternate to the hydrophilic separator 10, a hydrophobic separator or a combination of the two. The latter is generally illustrated in the alternate embodiment of FIG. 5, which was designed particularly for relatively high pressure systems, such as, for example, a three thousand (3,000 psia) pound per square inch system useful as, for example, in a hydrogen/oxygen propulsion system.

Figure 5:
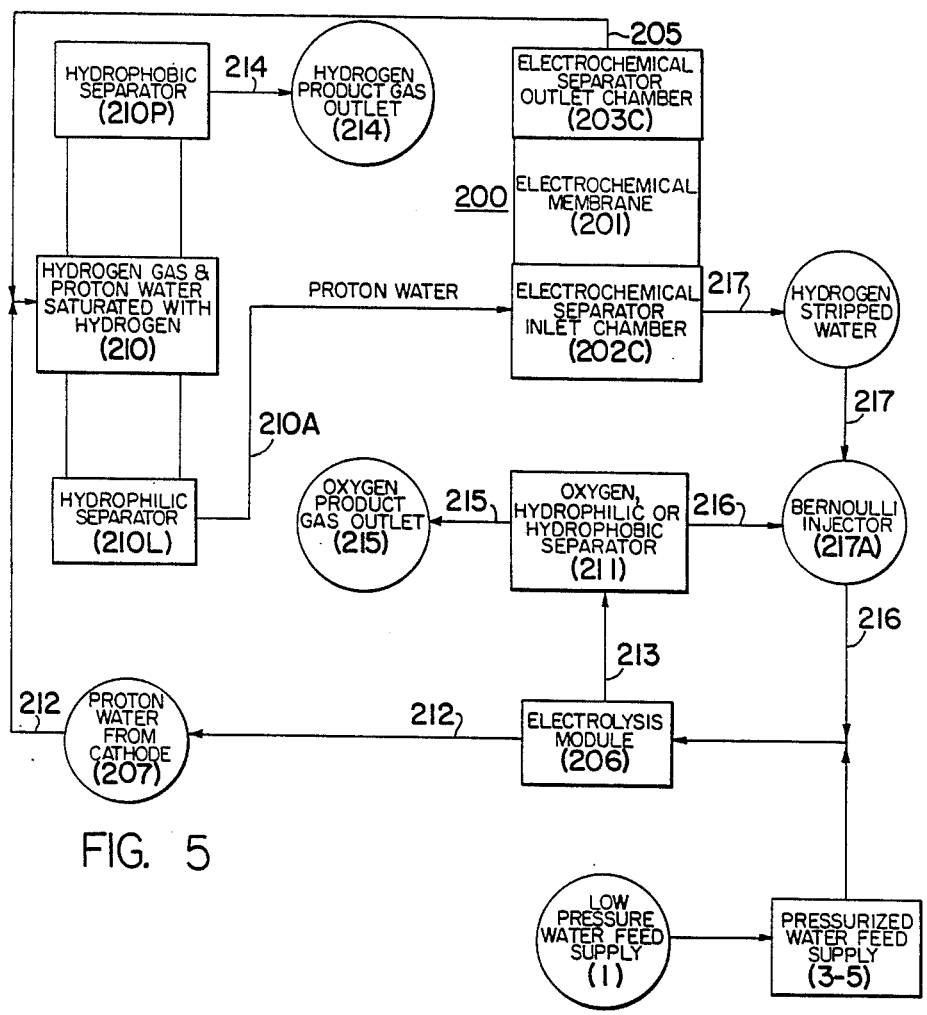
FIG. 5 is a simplified, flow chart diagram of an alternative, exemplary electrolysis system, in which alternate embodiment the hydrogen-stripped water is directly injected into the circulating oxygen-side water return loop of the electrolysis unit or module.

FIG. 5 illustrates an alternate embodiment of an electrolysis system using the principles of the present invention, it being noted that elements of this embodiment generally are similarly numbered to like or analogous elements of the embodiment of FIG. 1, with the former using a two hundred reference number scheme. Since the following elements are analogous and function at least generally the same, they will not be completely redescribed for the sake of brevity:

| FIG. 1 | FIG. 5 |
| --- | --- |
| 1 | 1 |
| 3–5 | "3–5" |
| 6 | 206 |
| 7 | 207 |
| 8 | — |
| 9 | — |
| 10 | 210L |
| 10A | 210A |
| 11 | 211 |
| 12 | 212 |
| 13 | 213 |
| 14 | 214 |
| 15 | 215 |
| 16 | 216 |
| 17 | 217 |
| 100 | 200 |
| 101 | 201 |
| 102C | 202C |
| 103C | 203C |

However, it is particularly noted that the embodiment of FIG. 5 includes upstream of the cathode/hydrogen outlet line 212 two, combined, stacked, phase preferential, separators 210—a hydrophilic separator section 210L and a hydrophobic separator section 210P. The hydrogen ($H_2$) outlet 214 of the hydrophobic separator 210P goes to the hydrogen product gas outlet, with the hydrogen product being in its relatively pure gaseous form, while the proton water outlet 210A of the hydrophilic separator 210L goes to the inlet chamber 202C of the electrochemical separator 200.

In turn the product outlet line 214 can be feed to a dryer (not illustrated), if so desired. An exemplary hydrophobic material for the separator 210P is "GORE-TEX" made of a tetrafluoroethylene (TFE) having a bubble pressure of, for example, three hundred and fifty (350) psi having pores of two hundredths of a micrometer.

The proton water outlet 210A goes to the inlet side of the electrochemical separator 200, with the hydrogen ($H_2$) outlet line 205 from the electrochemical separator being fed back into the line 212, in similar fashion to the embodiment of FIG. 1. The inlet chamber 201C can include, for example, a niobium (Nb) screen, while the outlet chamber can include, for example, a zirconium (Zr) screen.

In contrast to the feed-back line 17 of the embodiment of FIG. 1, the electrochemical separator feed-back line 217 is fed directly to the circulating, oxygen-side return loop line 216, allowing the stripped water to be injected directly into that line through, for example, a Bernoulli injector 217A. The feed-back line 217 is at a relatively high pressure, and such direct injection into the relatively high pressure oxygen-side return line 216 saves the energy of de-pressurizing and re-pressurizing the returned, hydrogen stripped water from the electrochemical separator 200.

Exemplary, relatively high pressures in the alternate embodiment of FIG. 5 are outlined below:

| Location | Exemplary Pressure (psia) |
| --- | --- |
| cathode outlet line 212 | 2,960 |
| $H_2$ product outlet 214 | 2,955 |
| return loop line 217 | 2,955 |
| $O_2$-side return loop line 216 | |
| downstream of 217A | 2,990 |
| in throat of 217A | 2,950 |
| upstream of 217A | 2,995 |
| $H_2$-side return loop line 217 | |

-continued

| Location | Exemplary Pressure (psia) |
|---|---|
| at injection point | 2,950–2,955 |

If desired, a pump could be used in the hydrogen-side return line 217 to insure the proper relative pressures for injecting the hydrogen stripped water into the oxygen-side return loop line 216, instead of using the Bernoulli injector 217A.

To insure the proper direction of flow, one or more check valves can be included within the flow lines of the embodiments of FIGS. 1 & 5.

Although this invention has been shown and described with respect to detailed, exemplary embodiments thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

1. A water electrolysis system for producing hydrogen ($H_2$) and oxygen ($O_2$) products in gaseous form from water ($H_2O$), comprising:
   an electrolysis module having a cathode/hydrogen chamber and an anode/oxygen chamber with an electrolysis membrane separating the two electrolysis chambers;
   a water feed input line feeding supply water to said anode/oxygen chamber of said module;
   a module hydrogen output line leading out of said cathode/hydrogen chamber carrying proton water from said module;
   a phase preferential, porous separator having an input line connected to said module hydrogen output line and an outlet for releasing hydrogen gas separated from said proton water; and
   an electrochemical hydrogen separator associated with and being down-stream from said phase preferential, porous separator and including
   an electrochemical inlet chamber,
   an electrochemical outlet chamber, and
   a membrane and electrode assembly located between
   said electrochemical chambers; said inlet chamber receiving water with hydrogen in solution from said phase preferential, porous separator, said assembly separating out hydrogen gas from said water with hydrogen in solution using electrochemistry through the electrochemical action of said assembly providing the hydrogen gas in solution with the protonically pumped water to said electrochemical outlet chamber; said electrochemical outlet chamber feeding back the hydrogen gas in solution with the protonically pumped water back to the phase preferential, porous separator; and said electrochemical inlet chamber supplying water electrochemically stripped of at least most of the hydrogen previously in solution ultimately to said anode/oxygen chamber of said electrolysis module; the gaseous hydrogen product being separated from water in said phase preferential porous separator without significant parasitic loss.

2. The water electrolysis system of claim 1, wherein: said electrochemical separator includes a solid, permeable, non-porous polymer layer sandwiched between two opposed electrodes.

3. The water electrolysis system of claim 2, wherein: said solid polymer membrane is made of a sulfonated fluorocarbon.

4. The water electrolysis system of claim 1, wherein: said phase preferential, porous separator and said electrochemical separator are stacked and integrated together, with the phase preferential, porous material layer forming the inlet side of said electrochemical inlet chamber.

5. The water electrolysis system of claim 1, wherein said phase preferential separator includes:
   a phase preferential, porous barrier layer located in-line between said phase preferential separator and said electrochemical separator, said barrier layer causing water with hydrogen in solution to flow from said phase preferential separator to said electrochemical separator but disallowing the flow of any hydrogen in gaseous form from flowing from said phase preferential separator to said electrochemical separator.

6. The water electrolysis system of claim 5, wherein said barrier layer is hydrophilic.

7. The water electrolysis system of claim 6, wherein there is further included:
   a further phase preferential, porous separator associated with the hydrophilic separator, said further separator being hydrophobic.

8. The water electrolysis system of claim 5, wherein said barrier layer is hydrophobic.

9. The water electrolysis system of claim 1, wherein there is further included:
   an oxygen/water separator separating oxygen ($O_2$) gas from water coming from said anode/oxygen chamber and including an outlet for releasing the separated oxygen gas; and
   a circulating oxygen-side water return loop line leading from said oxygen/water separator back to said anode/oxygen chamber at a relatively high pressure returning water from said anode/oxygen chamber back to said electrolysis module to be further processed; and wherein:
   said electrochemical inlet chamber supplies water electrochemically stripped of at least most of the hydrogen previously in solution directly to said water feed input line under a relatively low pressure separate and substantially downstream from said circulating oxygen-side water return loop line.

10. The water electrolysis system of claim 9, wherein there is included:
    a regulator in-line from said electrochemical output chamber to said water feed line controlling the differential pressure across the phase preferential, porous separator.

11. The water electrolysis system of claim 1, wherein there is further included:
    an oxygen/water separator separating oxygen ($O_2$) gas from water coming from said anode/oxygen chamber and including an outlet for releasing the separated oxygen gas; and
    a circulating oxygen-side water return loop line leading from said oxygen/water separator back to said anode/oxygen chamber at a relatively high pressure returning water from said anode/oxygen chamber back to said electrolysis module to be further processed; and wherein:

said electrochemical inlet chamber supplies water electrochemically stripped of at least most of the hydrogen previously in solution under relatively high pressure directly to said water return loop line.

12. A method of separating out hydrogen gas from proton water produced in a water electrolysis system producing hydrogen and oxygen in gaseous product form from water, comprising the following step(s):

(a) using a water electrolysis system, including
an electrolysis module having a cathode/hydrogen chamber and an anode/oxygen chamber with an electrolysis membrane separating the two electrolysis chambers;
a water feed input line feeding supply water to said anode/oxygen chamber of said module;
a module hydrogen output line leading out of said cathode/hydrogen chamber carrying proton water from said module;
a phase preferential, porous separator having an input line connected to said module hydrogen output line; and
an electrochemical hydrogen separator associated with and being down-stream from said phase preferential, porous separator and including
an electrochemical inlet chamber,
an electrochemical outlet chamber, and
a membrane and electrode assembly located between said electrochemical chambers;

(b) initially separating and releasing hydrogen gas from said proton water in said phase preferential, porous separator;

(c) then feeding the proton water with hydrogen in solution and without any separated hydrogen gas to said electrochemical separator to said electrochemical inlet chamber, providing said inlet chamber with proton water with hydrogen in solution from said phase preferential, porous separator;

(d) using said assembly to electrochemically separate out additional hydrogen gas from said proton water with hydrogen in solution using electrochemistry through the electrochemical action of said assembly, producing hydrogen gas in solution with the protonically pumped water in said electrochemical outlet chamber; and (e) feeding back the hydrogen gas in solution with the protonically pumped water from said electrochemical outlet chamber back to the phase preferential, porous separator and supplying water electrochemically stripped of at least most of the hydrogen previously in solution from said electrochemical inlet chamber ultimately to said anode/oxygen chamber of said electrolysis module; separating the desired gaseous hydrogen product from water in said phase preferential process separator without significant parasitic loss.

13. The method of claim 12, wherein in step "b" there is included the step of:
using hydrophilic action to initially separate out the hydrogen ($H_2$) from the proton water.

14. The method of claim 12, wherein in step "b" there is included the step of:
using hydrophobic action to initially separate out the hydrogen ($H_2$) from the proton water.

15. The method of claim 12, wherein in step "b" there is included the step of:
using both hydrophilic and hydrophobic action in two separate stages to separate out the hydrogen ($H_2$) from the proton water.

16. The method of claim 12, wherein in step "a" there is included the step of:
using a circulating oxygen-side water return loop line leading from said oxygen/water separator back to said anode/oxygen chamber at a relatively high pressure returning water from said anode/oxygen chamber back to said electrolysis module to be further processed; and
wherein in step "e" there is included the step of:
feeding water electrochemically stripped of at least most of the hydrogen previously in solution from said electrochemical inlet chamber under relatively low pressure to said water feed input line at a point substantially down-stream from said oxygen-side water return loop line.

17. The method of claim 12, wherein in step "a" there is included the step of:
using a circulating oxygen-side water return loop line leading from said oxygen/water separator back to said anode/oxygen chamber at a relatively high pressure returning water from said anode/oxygen chamber back to said electrolysis module to be further processed; and
wherein in step "e" there is included the step of:
feeding water electrochemically stripped of at least most of the hydrogen previously in solution from said electrochemical inlet chamber under relatively high pressure directly to said water return loop line.

* * * * *

UNITED STATES PATENT AND TRADEMARK OFFICE
CERTIFICATE OF CORRECTION

PATENT NO. : 4,950,371

DATED : August 21, 1990

INVENTOR(S) : James F. McElroy

It is certified that error appears in the above-identified patent and that said Letters Patent is hereby corrected as shown below:

Col. 6, line 23, after "preferential," insert --porous--.

Signed and Sealed this

Seventeenth Day of December, 1991

Attest:

HARRY F. MANBECK, JR.

Attesting Officer

Commissioner of Patents and Trademarks